(12) United States Patent
Miyamoto

(10) Patent No.: US 6,535,695 B2
(45) Date of Patent: Mar. 18, 2003

(54) LUMINOUS FUNCTION DISPLAY DEVICE FOR A CAMERA

(75) Inventor: Hidenori Miyamoto, Urayasu (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/989,054

(22) Filed: Nov. 21, 2001

(65) Prior Publication Data

US 2002/0031345 A1 Mar. 14, 2002

Related U.S. Application Data

(63) Continuation of application No. 08/887,845, filed on Jul. 3, 1997, now abandoned.

(30) Foreign Application Priority Data

Mar. 7, 1996 (JP) ............................................... 8-173536

(51) Int. Cl.[7] .............................. G03B 17/18; G03B 7/26
(52) U.S. Cl. ...................................... 396/287; 396/304
(58) Field of Search .............................. 396/281, 287, 396/288, 291, 529, 530, 531, 532, 533, 419, 420, 422, 424, 428, 304

(56) References Cited

U.S. PATENT DOCUMENTS

| | | | |
|---|---|---|---|
| 3,754,130 A | 8/1973 | Stone et al. | 362/29 |
| 3,845,394 A | 10/1974 | Hamada | 325/455 |
| 4,252,416 A | 2/1981 | Jaccard | 349/65 |
| 4,310,219 A | 1/1982 | Jaccard | 359/599 |
| 4,712,898 A | 12/1987 | Haraguchi | 396/419 |
| 5,265,071 A | 11/1993 | Thorgersen et al. | 368/67 |
| 5,339,294 A | 8/1994 | Rodgers | 368/67 |
| 5,345,284 A | 9/1994 | Tsuruta | 396/155 |
| 5,404,280 A | 4/1995 | Greek et al. | 362/198 |
| 5,408,388 A | 4/1995 | Kobayashi et al. | 362/31 |
| 5,555,065 A | 9/1996 | Tsukahara et al. | 396/282 |
| 5,649,244 A | 7/1997 | Sato et al. | 396/287 |
| 5,703,625 A | 12/1997 | Snider et al. | 345/168 |
| 5,710,409 A | 1/1998 | Schwarzbacker et al. | 219/506 |
| 5,745,809 A | 4/1998 | Kawahata | 396/287 |

OTHER PUBLICATIONS

Luminescent Materials, *Industrial Coatings*, No. 132, pp. 55–62 (Jan. 15, 1995) (with partial translation).

*Primary Examiner*—Christopher Mahoney

(57) ABSTRACT

A functional device has an operating button to control a function, a display window containing an indication of the function and a luminous device, containing a luminous material to illuminate the operating button and display window. The luminous device is formed from a one-piece continuous member containing luminous material. The material forming the luminous material is an aluminum oxide luminous material. A plurality of corresponding operating buttons and display windows may be formed in the functional device, with the luminous device formed of a plate to back light the plurality of display windows, luminous material formed in the plurality of operating buttons and connecting arms to connect plate to the operating buttons.

7 Claims, 4 Drawing Sheets

LUMINOUS FUNCTION DISPLAY DEVICE FOR A CAMERA

CROSS-REFERENCE TO RELATED APPLICATIONS

This application is a Continuation of U.S. patent application Ser. No. 08/887,845, filed Jul. 3, 1997, now abandoned. This application is based upon and claims priority to Japanese Patent Application No. 08-173536, filed Jul. 3, 1996, and U.S. patent application Ser. No. 08/887,845 filed on Jul. 3, 1997, the contents of which are incorporated herein by reference.

BACKGROUND OF THE INVENTION

1. Field of the Invention

The present invention relates to a function display device of a camera or the like equipment having an operating member, and in particular it relates to a function display device of an equipment which utilizes an operating member for night use.

2. Description of the Related Art

Function display devices which are made to light up for night use are generally known. Such function display devices included various types of illuminated operating buttons formed in a camera body.

As to specific examples of such function display devices, back lighting devices were positioned behind the above-mentioned various types of operating buttons formed in the camera body. Then, when the camera was used at night, the back lighting device was operated to illuminate the appropriate operating button from behind. This allowed the user to identify the setting/position of the operating button.

As another example of conventional function display devices, the operating buttons themselves, which operate the equipment, were formed with light emitting diodes ("LEDs") therein. The LEDs were caused to light up when the operating buttons were used at night.

However, the above-mentioned conventional function display devices had the following disadvantages. When the conventional back lighting device was used for illumination, the back lighting device consumed electric power, and the operating time of the battery provided in the camera was shortened. Furthermore, the space consumed by the back lighting device interfered with making the camera smaller.

Moreover, when conventional LEDs were used for illumination, the LEDs consumed electric power and shortened the operating time of the battery. Furthermore, the cost of the camera increased because of the LEDs.

Also, with the conventional function display devices, there was no provision to illuminate mechanical connecting portions of the camera. For example, there was no provision to illuminate mechanical portions of the camera necessary for attachment and detachment of the lens and no provision to illuminate mechanical portions of the camera necessary for mounting a tripod. Accordingly, it was difficult for the user to perform operations such as changing a lens and attaching a tripod, at night.

SUMMARY OF THE INVENTION

Accordingly, it is an object of the present invention to provide a function display device for illuminating operating buttons and other devices at night, which display device has a simple construction and does not consume electric battery power.

It is a further object of the present invention to provide a function display device which illuminates at night, an operating button and a display window containing a display corresponding to the setting, position of the operating button.

It is another object of the present invention to provide a function display device which, instead using electric power, absorbs energy from the atmosphere, its surroundings to later illuminate a subject.

It is yet another object of the present invention to provide a function display device which illuminates at night mechanical connection portions of the camera without using electric power.

It is still another object of the present invention to provide a function display device which does not use electric power, absorbs energy from the surroundings and stays illuminated in the dark for extended periods of time.

Additional objects and advantages of the invention will be set forth in part in the description which follows, and in part, will be obvious from the description, or may be learned by practice of the invention.

According to the present invention a functional device has an operating button to control a function, a display window containing an indication of the function and a luminous device, containing a luminous material to illuminate the operating button and display window. The luminous device is formed from a one-piece continuous member containing luminous material. The material forming the luminous material is an aluminum oxide luminous material. A plurality of corresponding operating buttons and display windows may be formed in the functional device, with the luminous device formed of a plate to back light the plurality of display windows, luminous material formed in the plurality of operating buttons and connecting arms to connect plate to the operating buttons.

A camera according to a preferred embodiment of the present invention has a lens mount and a lens illuminating device, formed of a luminous material and in the vicinity of the lens mount to illuminate the lens mount. The lens mount is circular and the lens illuminating device is formed as a ring surrounding the lens mount. A lens release button is formed of the same luminous material as that forming the lens illuminating device. A lens alignment index is also formed of the same luminous material as that forming the lens illuminating device. The camera may have a tripod screw hole and a tripod illuminating device, with the tripod illuminating device being formed of a luminous material and in the vicinity of the tripod screw hole, to illuminate the tripod screw hole.

BRIEF DESCRIPTION OF THE DRAWINGS

These and other objects and advantages of the invention will become apparent and more readily appreciated from the following description of the preferred embodiments taken in conjunction with the accompanying drawings of which.

DETAILED DESCRIPTION OF THE PREFERRED EMBODIMENTS

Figure 1:
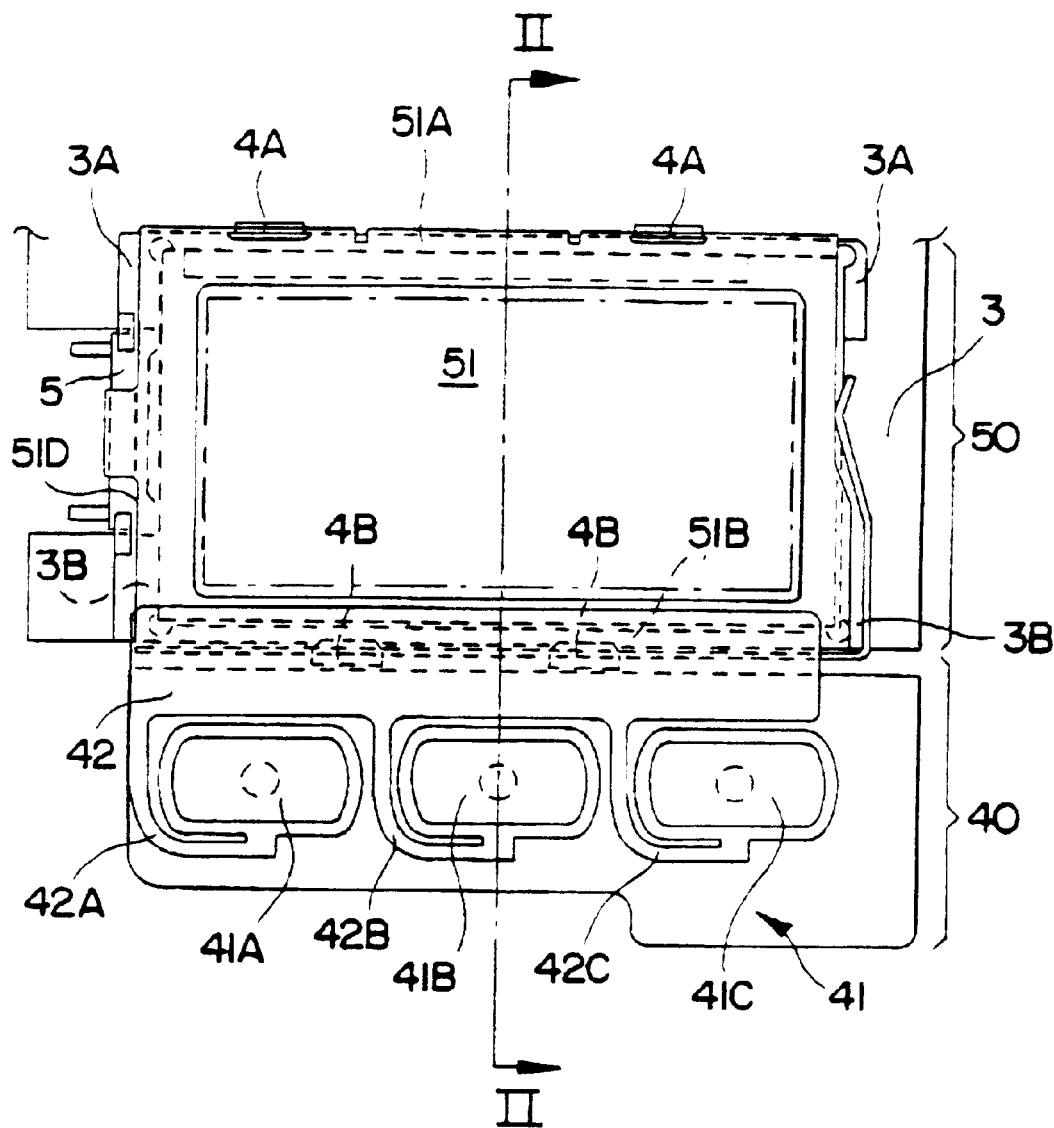
FIG. 1 is a front view of a first function display device according to the present invention.

Reference will now be made in detail to the present preferred embodiments of the present invention, examples of which are illustrated in the accompanying drawings, wherein like reference numerals refer to like elements throughout.

Referring to FIGS. 1–5, function display devices of the present invention will be described. The description is divided into three function display devices 10, 20 and 30. The function display devices are formed in a body 2 of a camera 1. However, it should be apparent that several of the function display devices are in no way restricted to a camera.

Figure 2:
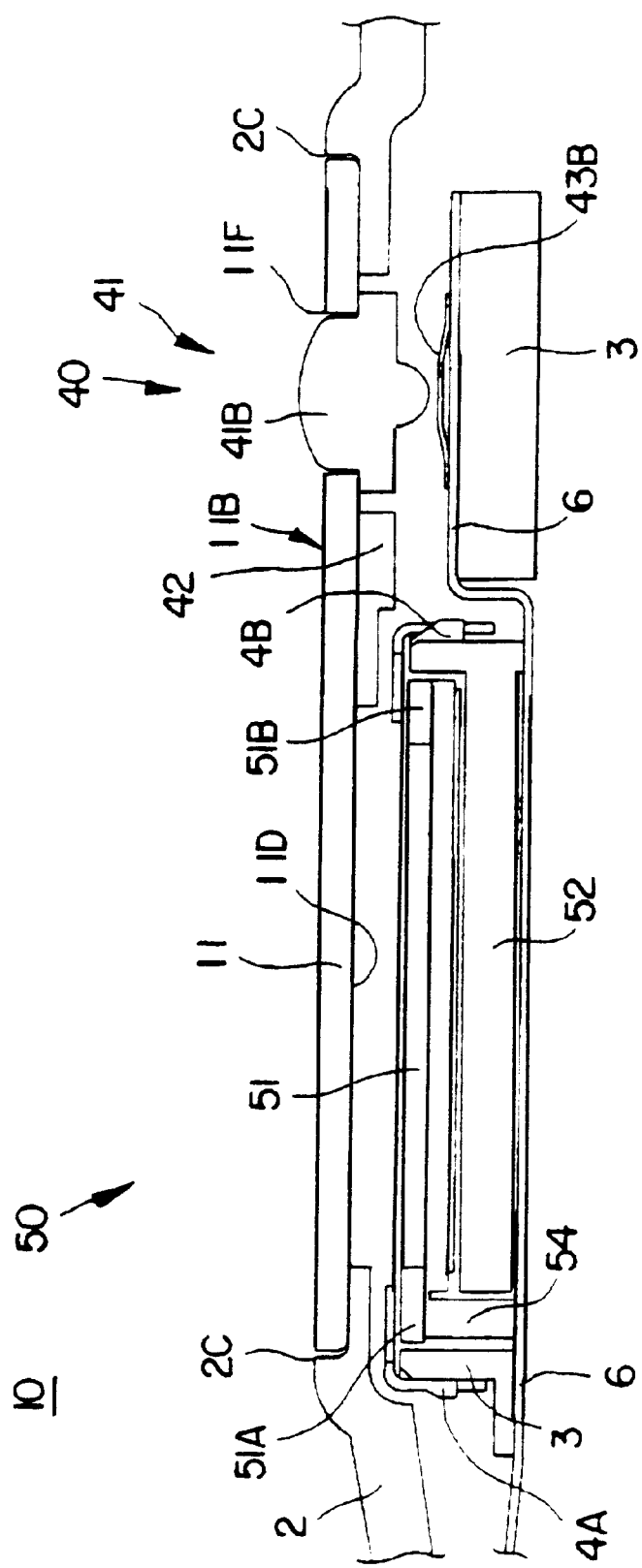
FIG. 2 is a cross-sectional view taken along line II—II of FIG. 1.
Figure 3:
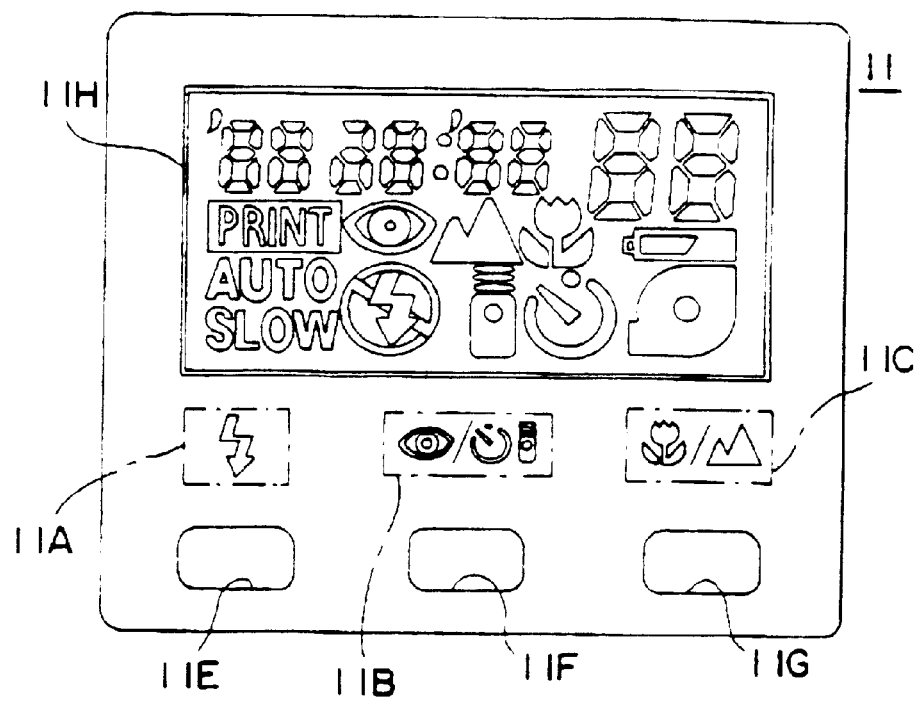
FIG. 3 is a front view of a transparent plate covering the function display device shown in FIG. 1.
Figure 4:
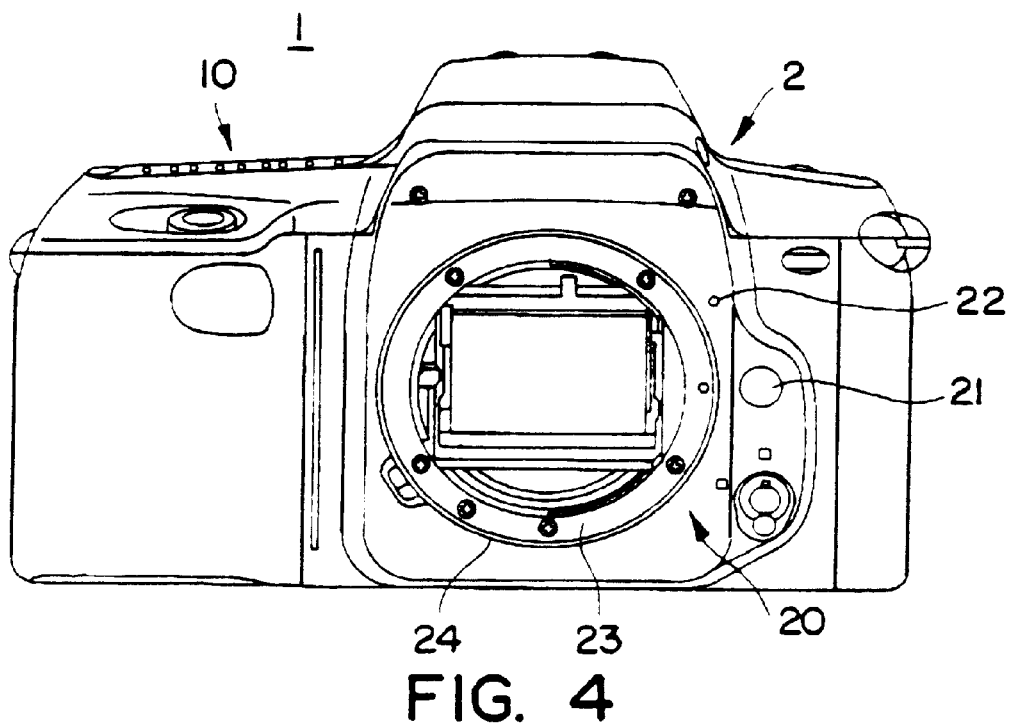
FIG. 4 is a front view of a camera equipped with function display devices according to the present invention.

A first function display device 10, shown in FIGS. 1 and 2, has a function change and display unit 40 and a liquid crystal display unit 50. Referring to FIG. 4, the first function display device 10 is formed in a top surface of the body 2 of camera 1. The function change and display unit 40 has three operating buttons 41A–41C and three function display windows 11A–11C (see FIG. 3). The function display windows 11A–11C are formed in a transparent plate 11. The dotted line surrounding the function display windows 11A–11C indicates that the function display windows 11A–11C have a different appearance than the surrounding portions of the transparent plate 11. For example, the surrounding portions of the transparent plate 11 may have black paint thereon, whereas the display windows 11A–11C may be clear. The function change and display unit 40 further has a light generating unit 42 (see FIG. 1).

The operating buttons select a mode of operation. Operating button 41A may be a button for changing the flash mode. Operating button 41B may be a button for controlling self-timing/red-eye reduction/remote control. Operating button 41C may be the button for changing between distant and macro photography. The operating buttons 41A–41C are located below the transparent plate 11, but project to the exterior through apertures 11E–11G (see FIG. 3) in the transparent plate 11. The operating buttons 41A–41C are formed integrally with the light generating unit 42. The operating buttons 41A–41C are coupled to the light generating unit 42 with resilient arm portions 42A–42C, respectively. The operating buttons 41A–41C, resilient arm portions 42A–42C and light generating unit 42 are formed of a single resin containing "luminous material." The term "luminous material" as used herein is to describe a material which absorbs energy from the atmosphere, its surrounding (for example absorbs light energy during the day) and later emits the energy as light. A preferred type of luminous material is described later. The function display windows 11A–11C (see FIG. 3) and the apertures 11E–11G are formed in the transparent plate 11 together with a liquid crystal display window 11H. As shown in FIG. 2, the first function display device 10 with transparent plate 11 is located in an aperture 2C formed in the body 2 of camera 1. The light generating unit 42 is formed behind the display windows 11A–11C, with only display window 11B being shown in FIG. 2.

A pattern in the function display windows 11A–11C and the liquid crystal display window 11H is formed by printing in gray or black on the back surface 11D (see FIG. 2) of the transparent plate 11. A white ground pattern is formed by selectively removing the black or gray printing. In FIG. 3, the pattern on the transparent plate 11 is shown as a matter of convenience as a black and white reversed pattern. The pattern formed in the liquid crystal display window 11H of FIG. 3 is the same pattern displayed in the liquid crystal display panel 51 (see FIGS. 1 and 2) which is located behind the transparent plate 11.

The liquid crystal display unit 50 of the first function display device 10 has the liquid crystal display panel 51 thereof positioned between body 2 of camera 1 and a connecting printed circuit board 6, as shown in FIG. 2. The liquid crystal display panel 51 is mounted in a holder frame 3 formed of a resilient plate. The liquid crystal display panel 51 is maintained in a mounting position by position setting walls 3A, 3B of holder frame 3. The liquid crystal display panel 51 has first and second ends 51A, 51B positioned as shown in FIGS. 1 and 2, in setting walls 3A, 3B of holder frame 3. Claw members 4A, 4B secure the liquid crystal display panel 51.

Reference numeral 5 in FIG. 1 represents an LED for illuminating the liquid crystal display panel 51. LED 5 shines light from a plane of incidence 51D to the light guide member 52. In FIG. 2, reference numeral 54 represents a zebra connector.

There are three click switches 43A–43C associated with operating buttons 41A–41C, respectively. Only clicks switch 43B is shown (in FIG. 2). The click switches are located at predetermined positions on the printed circuit board 6, behind operating buttons 41A–41C of the function change and display unit 40.

When the first function display device 10 described above is used at night, light from LED 5 shines on the liquid crystal display panel 51, and the user can identify, even at night, the display on liquid crystal display panel 51. Also, because the operating buttons 41A–41C are formed of a resin containing luminous material, the operating buttons 41A–41C will emit light at night so the user can identify the position thereof.

Moreover, to display the modes selected by the operating buttons at night, light is emitted from the light generating unit 42 (see FIG. 2) located behind the function display windows 41A–41C. Light emitted from the light generating unit 42 shines to the exterior via the function display windows 11A–11C. The function display windows 11A–11C are located in close proximity to the respective operating buttons 41A–1C, thereby allowing the user to know what operations the buttons 41A–41C control.

The light generating unit 42 will now be described. As mentioned above, the light generating unit 42 is formed of a resin containing a luminous material. Generally, luminous materials absorb and store light and later emit the light in the order of absorption →light emission →absorption →. . . Such luminous materials can be repeatedly used, time and time again. However, with common luminous materials, even after they have been exposed to light for sufficiently a long period of time, they will emit light for only about 1 to 2 hours. The common luminous materials contain phosphors as the light storage material.

As an alternative, radioactive materials, which spontaneously emit light (no prior light storage required), have also been used. However, the use of radioactive materials is severely restricted because of the radioactivity. For example, radioactive light emitting materials may be used in some watches. In addition to the radioactive emission problem, radioactive light emitting materials are expensive. Radioactive light emitting materials are not usable as operating buttons for cameras and similar equipment.

In the present invention, a preferred luminous material is an aluminum oxide luminous material, and more specifically a strontium aluminate ($SrAl_2O_4$). In a luminous material of this type, strontium aluminate is the host crystal with a number of different rare earth elements in the host crystal.

An example of such an aluminum oxide luminous material is a luminous material sold by an Nemoto Tokushu Kaga Ku KK under the trade name "N-LUMINOUS." This luminous material is formed from high purity alumina as the principle material. Strontium carbonate and rare earth elements are used as activating agents and are mixed with the alumina. The mixture is packed into a crucible and calcined in a reducing atmosphere in an electric furnace with a temperature of 1300° C. for three hours or more. A complete description of the manufacturing method is described in "Industrial Coatings," No. 132, Jan. 15, 1995, which is hereby incorporated by reference. Thus, a complete description of the manufacturing method is omitted.

Aluminum oxide luminous materials can emit light continuously for about eight hours. Aluminum oxide luminous materials may glow for ten times longer than common luminous materials.

Aluminum oxide luminous materials such as N-luminous may be used with resins such as methacrylic resins, ABS resins, polycarbonate resins, polyurethane resins, silicon rubbers, etc. When used with these resins, a mixture of perhaps 10 wt. % aluminum oxide luminous materials is used with 90 wt. % resin.

When the operating buttons 41A–41C and the light generating unit 42 are formed of an aluminum oxide luminous material, incident light is stored in the operating buttons 41A–41C and the light generating unit 42. After removal of incident light, operating buttons 41A–41C and light generating unit 42 will emit light for about eight hours. Thus, when the camera 1 is used at night, the user can identify the operating buttons 41A–41C and the light generating unit 42, and electric battery power is not consumed.

If the operating buttons 41A–41C and light generating unit 42 stop emitting light, the camera 1, and hence the operating buttons 41A–41C and light generating unit 42, can be irradiated with artificial light (for example, ultraviolet light from a fluorescent lamp) for approximately five minutes. Thereafter, operating buttons 41A–41C and light generating unit 42 will again emit light.

The second and third function display devices 20 and 30 will now be described.

The second function display device 20, shown in FIG. 4, includes a lens release button 21 for releasing the lens and a lens alignment index 24 for aligning the lens with a lens mount 23. The second display device 20 also includes a lens illuminating device 24 adjacent to or surrounding the lens mount 23. Lens release button 21 and lens alignment index 22 are formed on the body 2 of camera 1. Elements 21, 22 and 24 are formed of an aluminum oxide luminous material.

Figure 5:
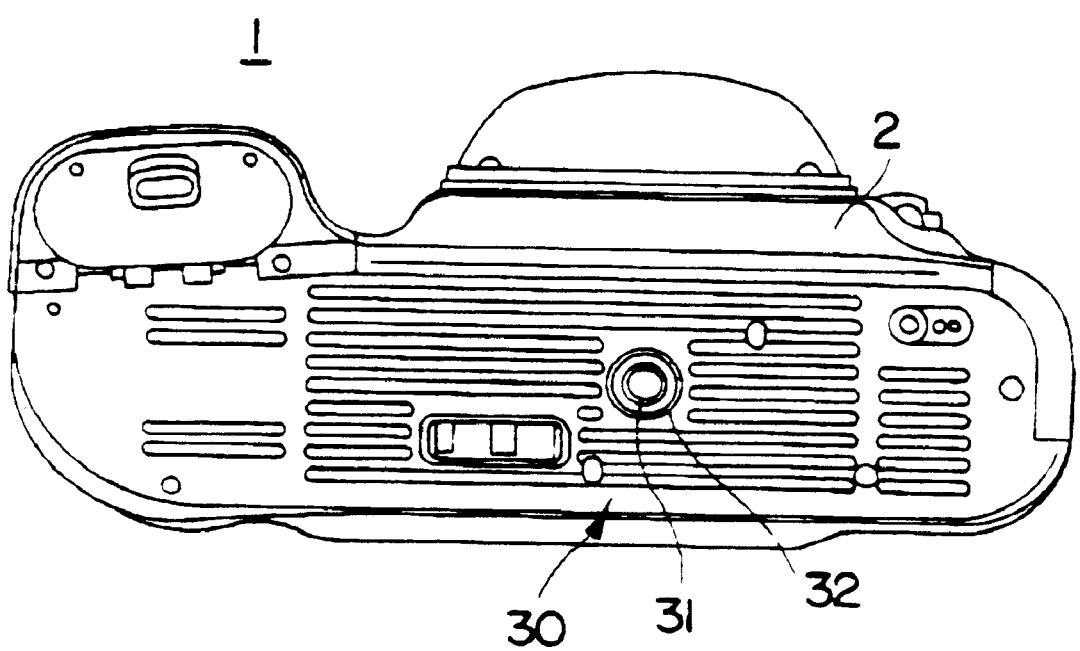
FIG. 5 is a bottom view of a camera equipped with the function display devices of the present invention.

The third function display device 30 is best seen in FIG. 5. The third function display device 30 includes an tripod illuminating device 32 for illuminating the tripod screw hole 31. The tripod illuminating device 32 is formed close to or surrounding the tripod screw hole 31, and is formed in a bottom surface of body 2 of camera 1. Tripod illuminating device 32 is formed of an aluminum oxide luminous material and illuminates tripod screw hole 31.

In the second and third function display devices 20, 30, the lens release button 21, lens alignment index 22, lens illuminating device 24 and tripod illuminating device 32 may be irradiated with light to store the light therein. Light will also be stored in the operating buttons 41A–41C and the light generating unit 42. After light is stored, these elements will emit light for about eight hours, allowing the camera to be used at night, without consuming electric battery power. With the second and third function display devices, lens release button 21 can be operated to release the lens, a new lens can be aligned with lens alignment index 22 and properly positioned on the lens mount 23 with lens illuminating device 24. This can be done at night. Also, with the tripod illuminating device 32, a tripod can be screwed into tripod screw hole 31 at night.

In the described embodiment, the operating buttons 41A–41C and the light generating unit 42 are described as being integrally formed, and formed from a resin containing an aluminum oxide luminous material. However, if a predetermined luminosity is obtained, it is possible that only the operating buttons 41A–41C and the light generating unit 42 are formed with the luminous material. That is, additional components, such as resilient arm portions 42A–42C, may not contain the luminous material. Furthermore, the operating buttons 41A–41C are described as being formed of a resin containing luminous material. However, it is possible that only a surface of the operating buttons 41A–41C will be coated with a pigment containing a luminous material.

In the second and third function display devices 20 and 30, lens release button 21, lens alignment index 22, lens illuminating device 24 and tripod illuminating device 32 are described as being formed from a resin containing luminous material. Alternatively, these elements may be formed from a resin which does not contain a luminous material, if their surfaces are coated with a luminous material.

It has been shown that if a light generating unit 42 and operating buttons 41A–41C formed of an aluminum oxide luminous material are incorporated into a compact camera, the light generating unit 42 and operating buttons 41A–41C will have sufficient brightness to identify the operating buttons 41A–41C and function display windows 11A–11C at night. Moreover, if sufficient light has been stored in the light generating unit 42 and operating buttons 41A–41C, these elements can be identified for an extended period of time (eight hours or more) at night. Thus, the compact camera made with these elements is generally suitable for night use.

Furthermore, if a lens release button 21, lens alignment index 22, lens illuminating device 24, and tripod illuminating device 32 are formed of a resin having an aluminum oxide luminous material therein and are incorporated into a compact camera, these elements will have sufficient brightness at night. That is, the lens release button 21, lens alignment index 22, lens illuminating device 24 and tripod illuminating device 32 can be sufficiently identified at night. Moreover, when these elements have stored sufficient light, they can be identified for an extended period of time (eight hours or more), at night. Thus, a compact camera formed, as described, is generally suitable for night use.

In accordance with a preferred embodiment of the present invention, a device having a simple construction, which does not consume electric power, is provided for illuminating various functional devices. The functional devices may be operating buttons on a camera. The functional devices may be an easy to form display window associated the operating button.

In accordance with a preferred embodiment of the present invention, energy other than electric power can be absorbed from the atmosphere/surroundings to illuminate the functional devices at night for the user to identify same.

Moreover, in accordance with a preferred embodiment of the present invention, a lens release button and lens alignment index can be identified at night without using electric power or requiring a complex construction.

Further, in accordance with a preferred embodiment of the present invention, the lens mount can be identified at night without using electric power requiring a complex construction.

Yet further, in accordance with a preferred embodiment of the present invention, a tripod screw hole can be identified at night without using electric power or requiring complex construction, thereby enabling tripod mounting and dismounting at night.

Still further, in accordance with a preferred embodiment of the present invention, function display devices will remain visible at night for extended periods of time, and these function display devices do not interfere with a goal of making a camera smaller.

Although a few of the preferred embodiments have been shown and described, it would be appreciated by those skilled in the art that changes may be made in these embodiments without departing from the principles and spirit of the invention, the scope of which is defined in the claims and their equivalents.

What is claimed is:

1. A functional device comprising:
   operation selection means for controlling a function;
   display means for displaying an indication of the function, the display means being separate from and adjacent to the operation selection means; and
   illuminating means, integrally formed with the operation selection means, for storing energy and illuminating the display means,
   wherein the operation selection means and the illuminating means include luminous material.

2. A functional device comprising:
   an operating button to control a function;
   a display window containing an indication of the function, the display window being separate from and adjacent to the operating button; and
   an illuminating device, integrally formed with the operating button, to illuminate the display window,
   wherein the operating button and the illuminating device include luminous material.

3. A functional device according to claim 2, wherein the illuminating device is formed from a one-piece continuous member containing luminous material.

4. A functional device according to claim 2, wherein the luminous material is an aluminum oxide luminous material.

5. A functional device according to claim 2, wherein a plurality of corresponding operating buttons and display windows are formed in the functional device, the illuminating device having:
   a plate to back light the plurality of display windows;
   luminous materials formed in the plurality of operating buttons; and
   connecting arms to connect the plate to the operating buttons.

6. A functional device comprising:
   operation selection means for controlling a function;
   display means for displaying an indication of the function, the display means bang separate from and adjacent to the operation selection means; and
   luminous means, integrally formed with the operation selection means, for storing energy used to generate illumination and illuminating the operation selection means and display means,
   wherein the luminous means stores the energy without consuming electric power.

7. A functional device comprising:
   an operating button to control a function;
   a display window containing an indication of the function, the display window being separate from and adjacent to the operating button; and
   a luminous device, integrally formed with the operating button and containing luminous material, to store energy used to generate illumination and to illuminate the operating button and the display window,
   wherein the luminous device stores the energy without consuming electric power.

* * * * *

UNITED STATES PATENT AND TRADEMARK OFFICE
CERTIFICATE OF CORRECTION

PATENT NO.    : 6,535,695 B2    Page 1 of 1
DATED         : March 18, 2003
INVENTOR(S)   : Hidenori Miyamoto It is certified that error appears in the above-identified patent and that said Letters Patent is hereby corrected as shown below:

<u>Column 8,</u>
Lines 15-25, replace the present claim 6 with new claim 6:
-- 6. A functional device comprising:
operation selection means for controlling a function;
display means for displaying an indication of the function, the display means being separate from and adjacent to the operation selection means; and
luminous means, integrally formed with the operation selection means, for storing energy used to generate illumination and illuminating the operation selection means and display means, wherein the luminous means stores the energy without consuming electric power. --

Signed and Sealed this

Sixteenth Day of September, 2003

JAMES E. ROGAN
*Director of the United States Patent and Trademark Office*